United States Patent
Holma

(10) Patent No.: US 7,821,928 B2
(45) Date of Patent: Oct. 26, 2010

(54) METHOD FOR MULTIPLEXING DIFFERENT BIT RATE SOURCES

(75) Inventor: Maunu Holma, Helsinki (FI)

(73) Assignee: Nokia Corporation (FI)

( * ) Notice: Subject to any disclaimer, the term of this patent is extended or adjusted under 35 U.S.C. 154(b) by 1522 days.

(21) Appl. No.: 10/432,528

(22) PCT Filed: Nov. 26, 2001

(86) PCT No.: PCT/FI01/01026

§ 371 (c)(1),
(2), (4) Date: Nov. 21, 2003

(87) PCT Pub. No.: WO02/45459

PCT Pub. Date: Jun. 6, 2002

(65) Prior Publication Data

US 2004/0066804 A1    Apr. 8, 2004

(30) Foreign Application Priority Data

Dec. 1, 2000    (FI)    .................................. 20002646

(51) Int. Cl.
G08C 15/00    (2006.01)
(52) U.S. Cl. .................................... 370/230
(58) Field of Classification Search .............. 370/395.1, 370/229–334, 389, 465, 395.51, 395.6, 532–541
See application file for complete search history.

(56) References Cited

U.S. PATENT DOCUMENTS

| 5,289,462 A | * | 2/1994 | Ahmadi et al. ............... 370/232 |
| 5,504,773 A | * | 4/1996 | Padovani et al. ............. 375/130 |
| 6,307,838 B1 | | 10/2001 | Haas |
| 6,894,991 B2 | * | 5/2005 | Ayyagari et al. ............. 370/325 |
| 7,095,744 B2 | * | 8/2006 | Iny .......................... 370/395.6 |
| 7,187,654 B1 | * | 3/2007 | Beshai et al. ............... 370/251 |
| 2002/0191540 A1 | * | 12/2002 | Fujii et al. ................... 370/229 |

FOREIGN PATENT DOCUMENTS

| EP | 0 961 444 A1 | 12/1999 |
| WO | WO 98/08357 | 2/1998 |
| WO | WO 99/45739 | 9/1999 |

* cited by examiner

Primary Examiner—Kwang B Yao
Assistant Examiner—Kenan Cehic
(74) Attorney, Agent, or Firm—Mintz Levin Cohn Ferris Glovsky and Popeo, P.C.

(57) ABSTRACT

This invention relates to the multiplexing of multiple sources in a multiplexer. A special arrangement is used for calculating an efficient peak capacity value that guarantees good performance for an outgoing link. The invention uses a method with two phases. The first phase precalculates the capacity of the outgoing link with different numbers of incoming links having equal packet size, and forms a table from the results of the precalculation. In the second phase, the peak capacity needed for the outgoing link is calculated using the precalculated tables.

9 Claims, 3 Drawing Sheets

| N | 0 | 1 | 2 | 3 | 4 | 5 | 6 | 7 | 8 | ...... | 300 |
|---|---|---|---|---|---|---|---|---|---|--------|-----|
| D | 0 | 10 | 10 | 11 | 12 | 12 | 12 | 13 | 13 | ...... | 300 |
FIG. 3
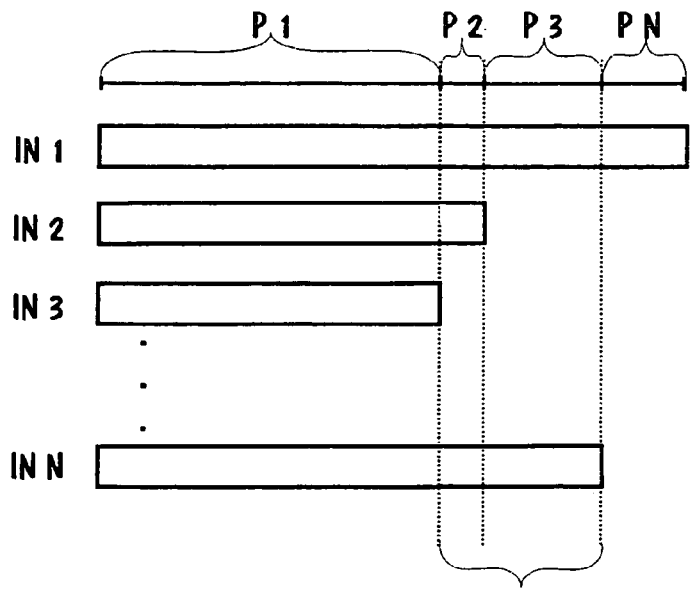
FIG. 4
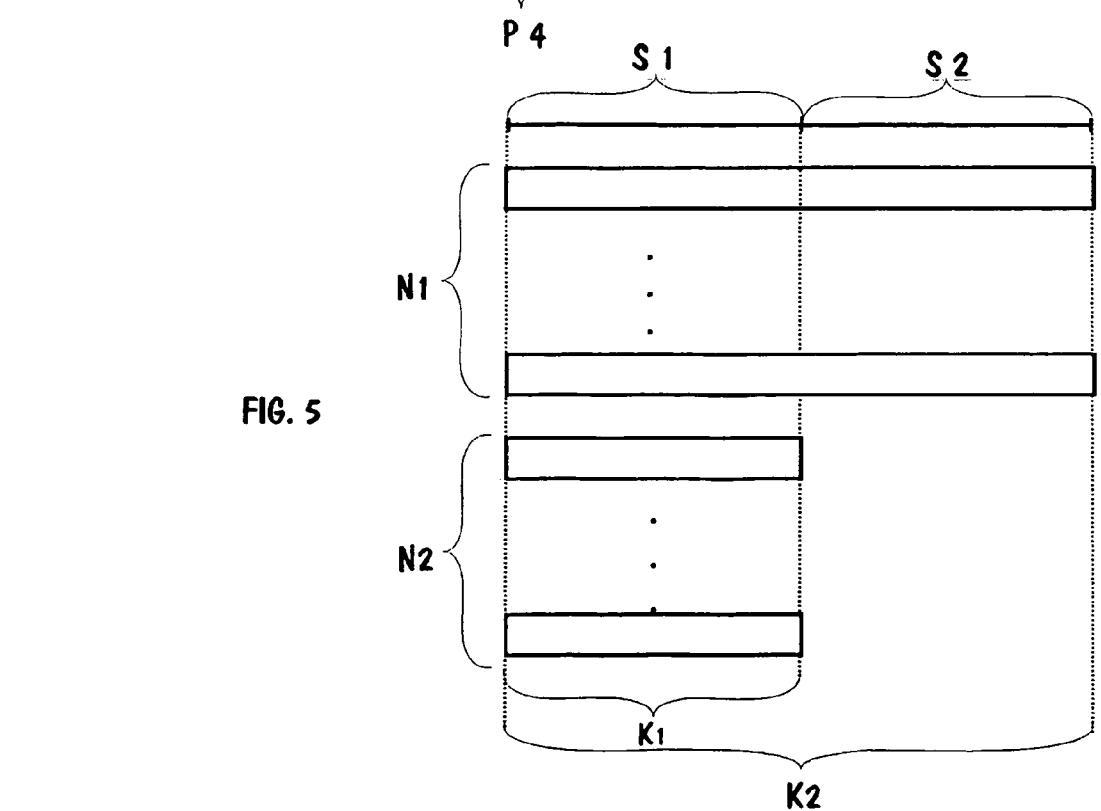
FIG. 5

METHOD FOR MULTIPLEXING DIFFERENT BIT RATE SOURCES

FIELD OF THE INVENTION

This invention relates to the multiplexing of multiple sources in a multiplexer. Especially, the invention relates to multiplexing in an ATM multiplexer. The invention also relates to a situation where the sources have different bit rates and/or different packet sizes (or batch sizes).

BACKGROUND OF THE INVENTION

FIG. 1 shows a typical example of an ATM multiplexer (1). The multiplexer joins different streams, such as video, voice and data, into a single ATM link (2). The ATM link transmits ATM cells, each cell containing 53 bytes—5 bytes for a header (3) that manages the routing of the cell, and 48 bytes for payload data (4). ATM was designed for constructing low-delay packet-switching links to give high performance bandwidth.

The ATM system offers functions for different applications. The system can be divided into layers (compare to the OSI layer model). Above the ATM layer, which handles, for example, the multiplexing and demultiplexing functions, is the ATM adaptation layer (AAL) that handles convergence, segmentation, and reassembly matters. It can be said that the AAL provides for the mapping of higher-layer protocol data units (PDUs) into the payload fields of ATM cells and the reassembly of these PDUs. Several AAL protocols exist that support different applications. One of these protocols is AAL 2.

AAL 2 is especially designed for bandwidth efficient transmission, for low-rate, short length packets in delay sensitive applications. For example, compressed voice as generated in mobile networks is such an application.

It is difficult, in certain implementation, to achieve good performance for a system. If requirements for a system are low-delay connections when there are few incoming links in asynchrony, but still connection establishment rates are high, it is difficult to find a peak allocation in a way that the ATM link performance is efficient. Either the performance tends to be low in these kinds of implementations, or the algorithms are too slow for real-time fast calculation. The goal of the invention is to solve the problem of the above-mentioned implementations. This is achieved in a way described in the claims.

SUMMARY OF THE INVENTION

Since packet size (or more generally batch size) may be different (due to different bit rates or different inter-packet time periods) in incoming links of the multiplexer, a special arrangement must be used for calculating an efficient peak capacity value that guarantees good performance for an outgoing link. The idea of the invention uses a method with two phases. The first phase precalculates the capacity of the outgoing link with different numbers of incoming links having equal packet size, and forms a table from the results of the precalculation. In the second phase, the peak capacity needed for the outgoing link is calculated.

The second phase cuts a piece from each packet of the incoming links with a fixed maximum piece size, then repeats this action for the remaining part of the packets from the different incoming links until the remaining part of the longest packet size is left. In this way, several sets of virtual packets are formed, each set containing virtual packets with equal length, and forming a virtual packet stream. A peak capacity value is calculated for each set (virtual stream). The values are calculated, one for each set by using the table formed in the first phase. The peak capacity value of each set is then scaled so that it reflects the fixed maximum piece size of that set. After this, the scaled peak values of the sets are added together for getting the peak capacity value for the outgoing link.

In the preferred embodiment of the invention, the number of the incoming links is relatively low. One preferred realization of the outgoing link is an ATM link.

BRIEF DESCRIPTION OF THE DRAWINGS

In the following the invention is described in more detail by means of FIGS. 1-7 in the attached drawings where.

FIG. 3 illustrates an example of a precalculated table for several transmission rates of an outgoing link, FIG. 4 illustrates an example of forming packet sets, each containing packets with equal length, FIG. 5 shows an example of forming two packet sets, when incoming links contain two packet sizes.

DETAILED DESCRIPTION OF THE INVENTION

In this example the first phase of the invention is based on a well-known N*D/D/1 model that calculates overflow probability. However any other suitable model could be used. In N*D/D/1, N=a number of identical constant-rate, constant-packet-size connections, i.e. a number of similar incoming links and, D=the number of packets that the outgoing server can serve in a time period between incoming packets of a single incoming link.

A well-known formula of the overflow probability can be written $$Q_D^N(x) = \sum_{x<n\leq N} \binom{N}{n} \left(\frac{n-x}{D}\right)^n \left(1 - \frac{n-x}{D}\right)^{N-n} \frac{D-N+x}{D-n+x}, \quad (1)$$

where x is an allowable queue size for incoming packets.

The formula (1) can be used for calculating the peak capacity value of an ATM link. In that case, the relation between the packet loss and the overflow probability is needed. Let's assume that the loss probability is equal to the overflow probability. However, this is not the only choice for the relation, but the validity of the choice depends on the case. The packet loss probability describes the allowable number of lost packets in relation to the number of packets sent during a certain time period.

Figure 1:
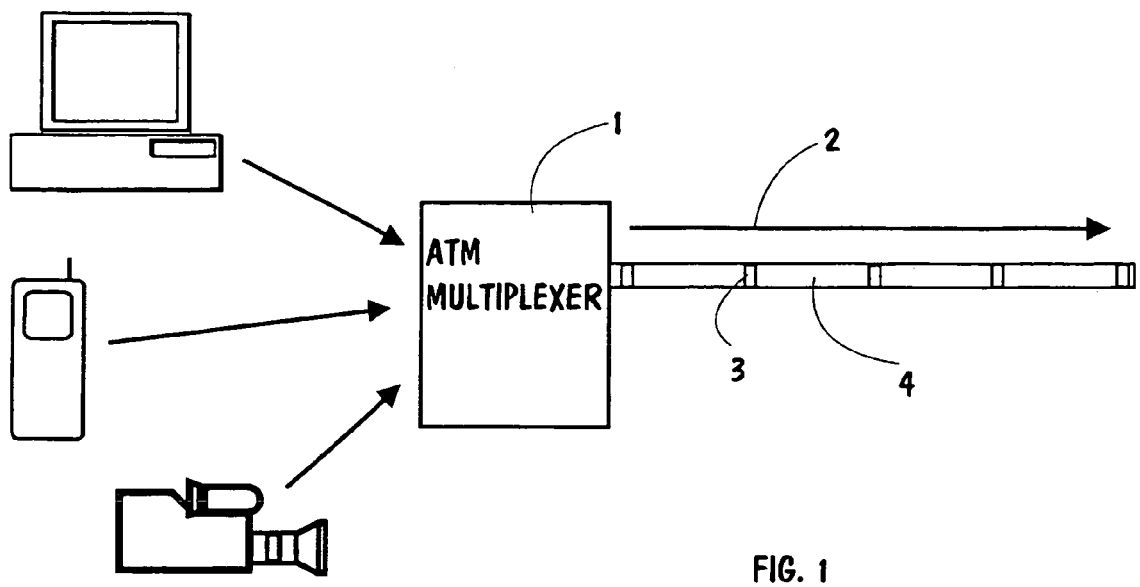
FIG. 1 illustrates an example of a known ATM multiplexer.
Figure 2:
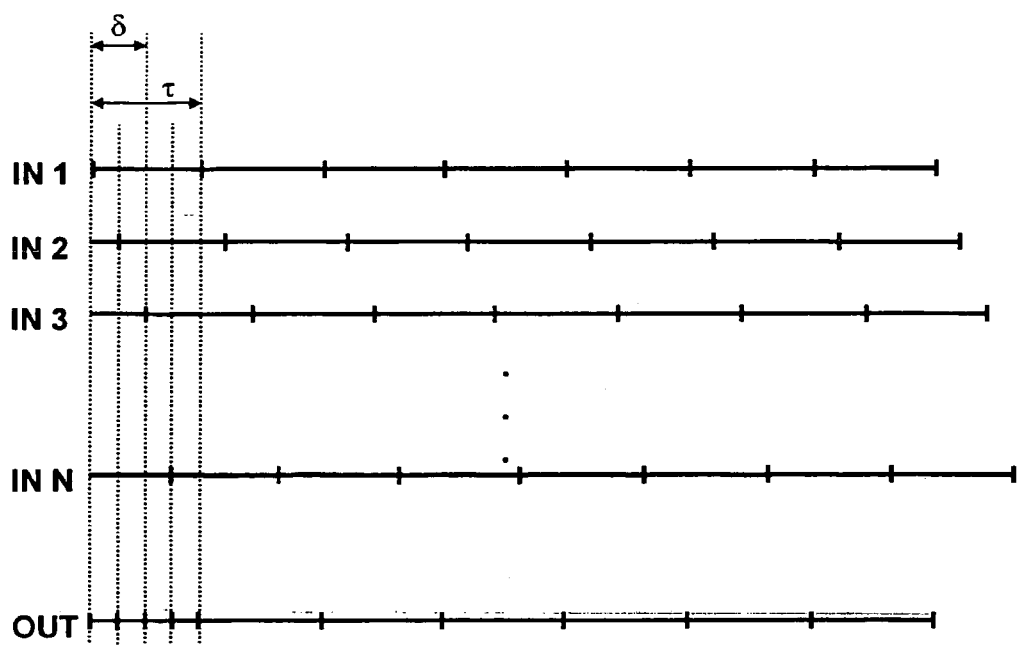
FIG. 2 illustrates an example of incoming links and an outgoing link with delays and transmission rates.

FIG. 2 illustrates an example of incoming links (IN 1, IN 2, . . . IN N) and an outgoing link (OUT). The symbol τ is a time value between incoming packets. In the case of FIG. 2, each incoming link has the same frequency to transmit packets, i.e. the same τ. As can be noticed, the frequency of sending packets at the outgoing link is four times greater than at the incoming links. It is worth noting that for the purpose of an easy description, the situation in FIG. 2 is a special one, where the incoming links come in a nice order, performing synchronously with the outgoing link. However, most real situations perform asynchronously with the outgoing link.

The symbol δ represents an allowable time for the delay of a packet. The maximum delay can be τ. D is 4 since it is possible to serve 4 incoming packets in the time τ. Let's take a new parameter into use, namely an allowable relative delay d that is d=δ/τ. Now, it is possible to substitute the allowable queue size, x=D*d, in the formula (1). D can be solved from the formula (1) in desired values of the loss probability ($Q_D^N$ (x)) and N. d depends on the structure of a system in the above-mentioned way. By solving D with several N values, it is possible to form a table, as shown in FIG. 3. It is worth noticing that when N is high enough, it is equal to D. The tables, such as in FIG. 3, can be precalculated for the use of different real-time situations and loss probabilities. The pre-calculation forms the first phase in the method according to the invention.

In the the second phase of the invention the peak capacity value for an ATM link is calculated in a way that the performance of the link is good, i.e. there is no useless extra capacity in the link.

FIG. 4 illustrates an example of how the peak capacity value is achieved. The figure shows incoming links with different packet sizes. By slicing the packets of each link into similar pieces, it is possible to find equal packet sizes for several links. In FIG. 4, the incoming link IN 3 transmits the shortest packets. By slicing the packets coming from the rest of the incoming links, in a way that each link contains packets the size (P1) of the packet of the link IN 3, virtually similar incoming links have been formed with the same frequency of incoming packets. Now, it is possible to use the precalculated tables from the first phase for finding a suitable peak capacity value D for the incoming packets of the size P1.

In FIG. 4, the next most common packet size for several incoming links is P2. Similarly, the following most common packet size is P3. Finally, the last packet size PN is the remaining part of the longest packet in the link IN1. The precalculated tables are used for every set with the same packet sizes (P1, P2, P3, . . . PN). Let's say that D1 is a peak capacity value for the packets P1, D2 for the packets P2, D3 for the packets P3, and finally DN for the packets PN. The capacity values D1 through Dn give the amount of packets of size P1 through Pn respectively that the server must be able to serve during time. By adding D1*P1+D2*P2+D3*P3+ . . . + Dn*Pn a peak capacity value of the outgoing link is achieved. The peak capacity value of the outgoing link tells the total traffic volume (e.g. the amount of bits) that the server must be able to serve during time τ. In a real implementation, it may be useful to do approximations. For example in FIG. 4, if packet sizes (P2, P3) are small, it is reasonable to approximate the sizes to a greater size. In this case the sizes P2 and P3 are considered to be too small, but the size P4 is considered to be reasonable. By careful choice of packet sizes, a peak capacity value does not grow too much.

Let's look at an example of two incoming link types. Both of the links are carrying speech data and: both of the links have the same frequency, τ=20 ms, for incoming packets, but different packet sizes, $K_1$=10 bytes and $K_2$=20 bytes (See FIG. 5). The numbers of connections are $N_1$=25 for the packet size $K_1$ and $N_2$=25 for the packet size $K_2$. These links are multiplexed together. The allowable delay δ=5 ms. The N*D/D/1 model can be used for achieving the capacity values for both the types, and sum up the results for achieving the total capacity requirement. Another choice is to use the method according to the invention.

According to the invention two virtual streams (sets) are formed: S1 and S2. Stream S1 consists of 25+25=50 packets of 10 bytes. Correspondingly, Stream S2 consists of 25 packets of 10 bytes. The N*D/D/1 model can be used for achieving the capacity values for both the streams, and the total capacity requirement is achieved by adding the results. Since τ=20 ms for the incoming packets and the packet sizes are 10 and 20 bytes, rates of 4 kbit/s and 8 kbit/s are applied for the incoming link types. The desired loss probability is 1E-5 with an allowable delay 5 ms. Table 1 shows what is the required capacity when the N*D/D/1 model is used in a trivial way and when the capacity is achieved according to the invention. Link utilization describes how efficiently the outgoing link works.

TABLE 1

| Used method | N*D/D/1<br>25*4 kbit/s + 25*8 kbit/s | Invention<br>50*4 kbits/s + 25*4 kbit/s |
|---|---|---|
| Required capacity kbits/s | 614.8 | 530 |
| Link utilization % | 48.8 | 56.6 |

As can be noticed, the required capacity is smaller using the method according to the invention. The outgoing link, which is going to be established, is also used more efficiently. Furthermore, it is worth noticing that the results depend strongly on the requirements used, such as the loss probability and the allowable delay.

Figure 6:
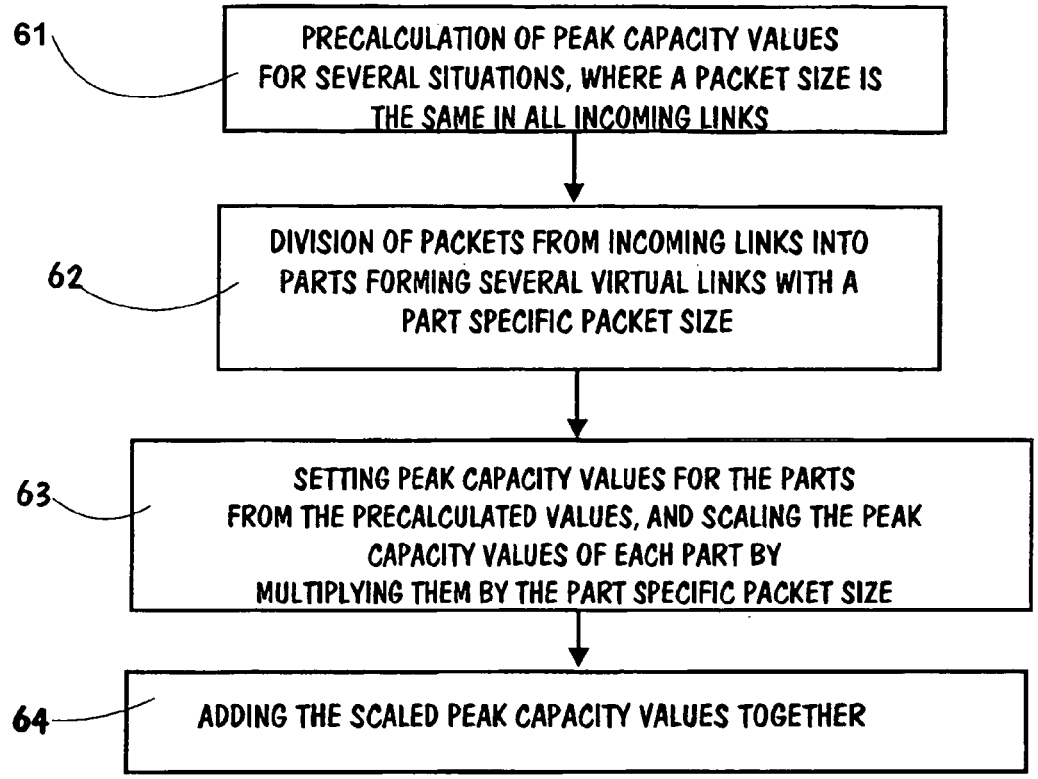
FIG. 6 shows an example of a method according to the invention in a flow diagram.

FIG. 6 illustrates an example of the method according to the invention in a flow chart form. The first phase (61) is to precalculate peak capacity values for different situations, such as a different number of incoming links, τ and δ values, assuming that incoming links transmit packets with the same size. In such cases, the N*D/D/1 model can be used. The second phase (62) is to divide packets coming from the incoming links into parts, so that each part consists of packets from the incoming links with a suitable packet length, at most one part from any packet. In other words, it can be thought that there are formed several virtual packet streams, each stream including packets with a maximum stream specific length. In the third phase (63) the peak capacity values for the streams are found from the precalculated values (set according to the precalculated arrays), and scaled by multiplying the precalculated values by the stream specific part length. In the fourth phase (64) the peak capacity value for the outgoing link is calculated by adding the scaled capacity values together.

Figure 7:
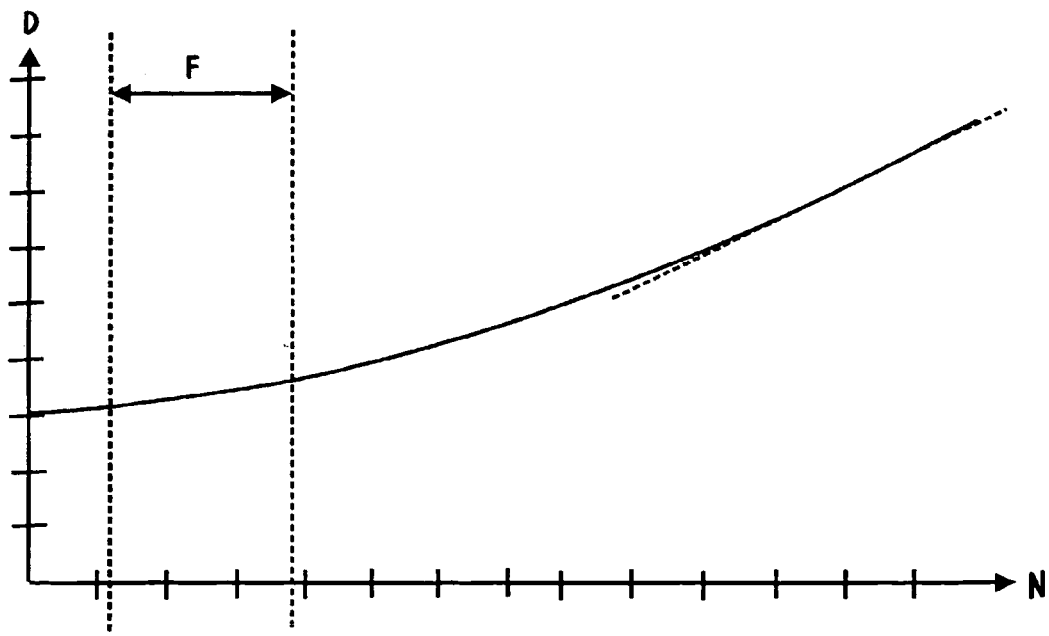
FIG. 7 shows an example of a diagram representing the behavior of an outgoing link capacity with a different number of incoming links.

FIG. 7 illustrates an example of the nature of a peak capacity value, when the number of incoming links changes. As can be noticed, the peak capacity value does not change linearly when the number of incoming links changes. When the number of incoming links is great, the change is linear. The preferable area for using the method of the invention is the area (F) of a relatively low number of connections. Due to the unlinearity, it is difficult to find a suitable peak capacity value, but the invention offers a solution for this problem.

Although, the method according to the invention is described only in the few above-mentioned examples, it is obvious that the invention can be realized in many ways, such as different variations of dividing incoming packets, in the scope of the inventive idea.

The invention claimed is:

1. A method comprising:
    precalculating, by a multiplexer, arrays of peak capacity values, each array running for several numbers of incoming links, and said each array comprising a specific situation where the incoming links transmit packets within the same size;
    dividing the packets coming from the incoming links into parts, and regrouping the parts, each group having a maximum part size, and said each group containing at most one part from any packet;
    setting peak capacity values for the groups according to the precalculated arrays;
    scaling the peak capacity value of each group by multiplying each group by the maximum part size of that group;
    setting the peak capacity value of an outgoing link to be the sum of the scaled peak capacity values of the groups; and
    establishing the outgoing link.

2. A method comprising:
    precalculating, by a multiplexer, arrays of peak capacity values, each array running for several numbers of incoming links, and said each array comprising a specific situation where the incoming links transmit packets within the same size;
    dividing the packets coming from the incoming links into parts, and regrouping the parts, each group having a maximum part size, and said each group containing at most one part from any packet;
    wherein, in said dividing of the packets,
    the length of a shortest packet defines the length of a first part for the packets coming from all the incoming links,
    the length of a part of a next shortest packet, which is left after the first part, defines the length of a second part for the packets coming from the incoming links, except the link transmitting the shortest packets, and
    the length of a third and remaining parts are defined correspondingly, until the length of a final part is the length of a remaining part of a longest packet;
    setting peak capacity values for the groups according to the precalculated arrays;
    scaling the peak capacity value of each group by multiplying each group by the maximum part size of that group;
    setting the peak capacity value of an outgoing link to be the sum of the scaled peak capacity values of the groups; and
    establishing the outgoing link.

3. A method comprising:
    precalculating, by a multiplexer, arrays of peak capacity values, each array running for several numbers of incoming links, and said each array comprising a specific situation where the incoming links transmit packets within the same size;
    dividing the packets coming from the incoming links into parts, and regrouping the parts, each group having a maximum part size, and said each group containing at most one part from any packet;
    wherein, in the dividing of the packets,
    the length of a shortest packet defines the length of a first part for the packets coming from all the incoming links, and
    the lengths of remaining parts of the packets are defined as having certain lengths, although the lengths of the parts after the first part are shorter than said certain lengths;
    setting peak capacity values for the groups according to the precalculated arrays;
    scaling the peak capacity value of each group by multiplying each group by the maximum part size of that group;
    setting the peak capacity value of an outgoing link to be the sum of the scaled peak capacity values of the groups; and
    establishing the outgoing link.

4. A method according to claim 1, wherein, in the dividing of the packets, the lengths of the parts are defined to have certain lengths.

5. A method according to claim 1, wherein the precalculating uses the formula $$Q_D^N(x) = \sum_{x<n\leq N} \binom{N}{n}\left(\frac{n-x}{D}\right)^n\left(1-\frac{n-x}{D}\right)^{N-n}\frac{D-N+x}{D-n+x}$$

where
N=a number of similar incoming links,
D=the number of packets that can be served in a time period between incoming packets in a single link,
x=an allowable queue size,
$Q_D^N(x)$=a desired value of loss probability.

6. A method according to claim 1, wherein there is a low number of incoming links relative to a number of outgoing links.

7. A method according to claim 1, wherein the outgoing link is an asynchronous transfer mode (ATM) link.

8. A multiplexer arranged to perform steps, wherein the steps comprise:
    precalculate arrays of peak capacity values, each array running for several numbers of incoming links, and said each array comprising a specific situation where the incoming links transmit packets within the same size;
    divide the packets coming from the incoming links into parts, and regrouping the parts, each group having a maximum part size, and said each group containing at most one part from any packet;
    set peak capacity values for the groups according to the precalculated arrays;
    scale the peak capacity value of each group by multiplying each group by the maximum part size of that group; and
    set the peak capacity value of an outgoing link to be the sum of the scaled peak capacity values of the groups.

9. A method comprising:
    precalculating, by a multiplexer, arrays of peak capacity values, each array running for several numbers of incoming links, and said each array comprising a specific situation where the incoming links transmit packets within the same size;
    dividing the packets coming from the incoming links into parts, and regrouping the parts, each group having a maximum part size, and said each group containing at most one part from any packet;
    setting required peak capacity values for the groups according to the precalculated arrays;
    scaling the required peak capacity value of each group by multiplying each group by the maximum part size of that group;
    setting the required peak capacity value of an outgoing link to be the sum of the scaled required peak capacity values of the groups; and
    establishing the outgoing link.

* * * * *